United States Patent [19]

Pieper et al.

[11] Patent Number: 5,152,611
[45] Date of Patent: Oct. 6, 1992

[54] ARTICLE HAVING A TEMPERATURE INDICATOR

[75] Inventors: Detlef Pieper, Roedental Moenchr; Ralf-Juergen Binnewirtz, Krefeld; Dunja Basten, Hagen, all of Fed. Rep. of Germany

[73] Assignee: RXS Schrumpftechnik-Garnituren GmbH, Fed. Rep. of Germany

[21] Appl. No.: 654,522

[22] Filed: Feb. 13, 1991

[30] Foreign Application Priority Data

Mar. 21, 1990 [DE] Fed. Rep. of Germany ....... 4009115

[51] Int. Cl.$^5$ .................. G01K 11/06; G01K 11/16; G01K 11/18; C09K 3/00; C09K 5/26
[52] U.S. Cl. .................. 374/160; 374/161; 374/162; 252/962; 252/586
[58] Field of Search .......... 374/160, 161, 162, 106; 116/217; 252/586, 962

[56] References Cited

U.S. PATENT DOCUMENTS

| | | | |
|---|---|---|---|
| 2,269,038 | 1/1942 | Perry | 374/106 |
| 2,799,167 | 7/1957 | Loconti | 374/160 |
| 2,928,791 | 3/1960 | Loconti | 374/162 |
| 3,002,385 | 10/1961 | Wahl et al. | 374/106 |
| 3,175,401 | 3/1965 | Geldmacher | 374/106 |
| 3,430,491 | 3/1969 | Gignilliat, III | 374/160 |
| 3,465,590 | 9/1969 | Kluth et al. | 374/162 |
| 3,521,489 | 7/1970 | Finkelstein et al. | 374/106 |
| 3,785,336 | 1/1974 | Roszkowski | 374/162 |
| 3,859,856 | 1/1975 | Keele et al. | 374/160 |
| 4,121,011 | 10/1978 | Glover et al. | 116/217 |
| 4,268,413 | 5/1981 | Dabisch | 374/161 |
| 4,280,441 | 7/1981 | McNeely | 116/217 |
| 4,344,909 | 8/1982 | De Blauwe | 374/162 |
| 4,445,787 | 5/1984 | Parker | 374/162 |
| 4,450,023 | 5/1984 | De Blauwe | 374/162 |
| 4,743,398 | 5/1988 | Brown et al. | 374/161 |
| 4,743,557 | 5/1988 | Tiru et al. | 374/161 |

FOREIGN PATENT DOCUMENTS 0042285 6/1983 European Pat. Off. .
3307567 9/1984 Fed. Rep. of Germany .
3326021 1/1985 Fed. Rep. of Germany .

OTHER PUBLICATIONS

Chemie-Lexikon, Dr. Hermann Rompp, second edition, p. 1631 (1950).

*Primary Examiner*—William A. Cuchlinski, Jr.
*Assistant Examiner*—Diego F. F. Gutierrez
*Attorney, Agent, or Firm*—Hill, Van Santen, Steadman & Simpson

[57] ABSTRACT

The invention relates to a heat-shrinkable article that is at least partially coated with a temperature indicator. This temperature indicator is composed of an organic polymer having a suitable bonding agent, whereby the organic polymer is contained therein in a finely ground condition. As a result of this condition, the appearance of the agent is opaque and has a color corresponding to the degree of granulation and material constituent. When the melting point of the composition is reached, the material melts and becomes transparent or at least translucent. The color of the article shows through, so that this color change can be interpreted as a temperature indication.

30 Claims, 1 Drawing Sheet

ARTICLE HAVING A TEMPERATURE INDICATOR

BACKGROUND OF THE INVENTION

The present invention relates to articles having a temperature indicator applied thereon. The temperature indicator contains a bonding agent and at least one fine-grained, organic substance that is largely opaque below a defined temperatue and melts when the defined temperature is reached and thus changes its optical properties, so that the temperature indicator becomes transparent or translucent.

Temperature indicators, or thermochromic coatings are materials that change color at a certain temperature. Thermochromic materials have been used as temperature indicators in heat-shrinkable products such as, for example, heat-shrinkable collars of cross-linked polymers. To this end, in such heat-shrinkable products, heat-activatable sealants, for example hot-melted glues, are applied onto an inside surface. The sealants melt at a defined temperature, producing a desired, sealing connection between the heat-shrunk product and the substrate to be enveloped.

The necessary heating to activate the material is provided through the use of an external heating source, for example a flame. The heat activation, however, can require greater heating than is required for the actual shrink process of the heat-shrinkable product. In order to ensure that the necessary heat activation has occurred on the inside, the outside surface of the heat-shrinkable product is provided with a temperature indicator. The temperature indicator, by changing color, indicates that the temperature at which one can assume that the required heat activation of the sealant has been successfully carried out at the inside, has been reached on the outside of the surface.

A temperature indicator can also be used to avoid subjecting the outside of the material to unnecessary heating that can damage the material under certain circumstances. The temperature indicator must also be irreversible, so that it is guaranteed that the color change, once it has occurred during the thermal treatment, remains.

U.S. Pat. No. 4,344,909, for example, discloses thermochromic compositions that cerntain an organic material that decomposes while producing a visible color change. This color change proceeds, for example, from green to black, whereby a certain coking occurs among other things. The decomposition products of the organic material are colorless and pigments are added to achieve the initial green color. Gaseous decomposition products, as well as carbon-like and tar-like residues on the surface of the collar are produced in these decomposition reactions. The formation of craters can occur. Moreover, there is the risk that the original color will be restored due to the reaction of the soil moisture as a consequence of the release of undecomposed, green pigment particles.

European Patent 0 042 285 discloses a countermeasure thereto. A bonding agent is provided that enters into an interaction with the decomposed organic material in order to prevent a leaching process from the composition.

Initially, inorganic pigments that experience a change in color at a prescribed temperature were often used for temperature indication. Salts of heavy metals such as lead, cobalt, cadmium, nickel, chromium, mercury or copper were predominantly used as such pigments (see Chemie-Lexikon, Dr. Hermann Roempp, Second Edition, 1950, page 1631). For example, such compounds were mixed with a suitable bonding agent composed of a synthetic resin and spirits and were then applied onto the articles to be monitored with brushes or, respectively, spray guns.

A disadvantage of the use of such materials is that they can result in environmental pollution. Under certain circumstances, moreover, inorganic thermochromes damage the shrinkable material. This is particularly true during the shrink process. Additionally, craters can form on the surface of the material, whereby a catalytic decomposition reaction on the surface can also be anticipated; this still being capable of acting even during later use. U.S. Pat. No. 4,121,011 discloses the addition of additives to such compounds to alleviate this later disadvantage.

Another attempt at solving the problems, that have been encountered with temperature indications, is to use materials that are essentially opaque initially condition, but, which melt when a predefined temperature is exceeded and thereby change their optical properties and become transparent or, respectively, translucent. This causes the substrate or, resepctively, the color of the substrate to become visible allowing this event to be utilized as a temperature indication.

For example, German Published Application 33 07 567 discloses a heat-restroable article whereat an outer layer of polyethylene or polypropylene that is opaque at normal temperature is extruded on. When the crystallization temperature is reached, the outer, continuous layer becomes transparent and the color of the inside layer becomes visible.

German Published Application 33 26 021 discloses the use of a coating composition composed of a pigment and of a bonding agent as a temperature indicator in a heat-restorable article. The pigment and bonding agent are composed of materials having different refractive indices. When the melting temperature of the pigment and/or bonding agent is reached, a substances having a uniform refractive index is formed. This change in the refractive index leads to a visible change in color.

U.S. Pat. No. 2,269,038 discloses color indications wherein fine-grained substances are employed with a suitable bonding agent. These substances are applied as a film on non-modifiable foundations. When a temperature prescribed by the material is exceeded, this substance composed of the inorganic pigment and of the bonding agent melts. The result of the process is that the coat becomes transparent, allowing the color of the foundation to be seen.

U.S. Pat. No. 2,928,791 discloses a temperature indicator composed of a white, crystalline, organic substance that melts when the melting temperature is reached and is absorbed by the carrier. A visible, irreversible color change thereby results. Here, too, color indicators are applied on rigid, invariable foundations.

U.S. Pat. No. 3,002,385 also discloses organic substances and mixtures of inorganic salts for temperature indication. When a given temperature is reached, the material melts and is absorbed by the colored foundation.

SUMMARY OF THE INVENTION

The present invention provides an article with a temperature indicator that can be manufactured in a simple and economical manner. No reaction products are released upon application and good compatibility with the surface of the article is ensured.

To this end, an article having a temperature indicator applied thereon, is provided. The temperature indicator contains a bonding agent and at least one fine-grained organic substance that is largely opaque below a defined temperature and that melts and changes its optical properties when the defined temperature is reached, so that the temperature indicator becomes transparent or translucent. At least one organic polymer is employed as the substance and the substance is applied onto a heat-shrinkable article. The melting point of the temperature indicator lies at least in the range, preferably above the range, of the temperature necessary to restore the heat-shrinkable article.

In an embodiment, the color indicator contains a fine-grained substance that is produced by grinding.

In an embodiment, the substance has a filter grain size of approximately $\leq 200$ μm, preferably approximately $\leq 100$ μm, whereby the mean grain size lies between approximately 10 to about 50 μm.

In an embodiment, the change-over temperature lies in the range of between approximately 150° C. to about 300° C., preferably between 200° and 260° C.

In an embodiment, the substance is composed of a mixture of several polymers.

In an embodiment, the organic polymer is a polyamide. In a further embodiment, the polymer is chosen from the group consisting of polyamide 6, polyamide 66, polyamide 610, and polyamide 12.

In an embodiment, the organic polymer is chosen from the group consisting of polyester, polybutyleneterephthalate, polycarbonate, polyolefin, and poly-4-methylpentene-1.

In an embodiment, the organic polymer is an olefin copolymerizate.

In an embodiment, the polymer is at least semi-crystalline.

In an embodiment, a polymeric resin is employed as a bonding agent. In a further embodiment, the bonding agent is chosen from the group consisting of: acrylate resin, e.g., Paraloid B66; alkyd resin, e.g., an acrylated alkyd resin; maleinate resin; ethylene vinyl acetate copolymer; ethylene acrylate acid copolymer; ethylene acrylate copolymer; a terpolymer of the monomers, e.g., ethylene, vinyl acetate, acrylate acid, acrylate acid ester, or maleic acid anhydride; an ionomer; and a polyamide resin.

In an embodiment, the polymer bonding agents have a mean molecular weight of from approximately 3000 to about 50,000.

In an embodiment, an organic solvent, preferably 1,1,1-trichloroethane, is used.

In an embodiment, an inorganic solvent is used.

The present invention also provides a method for manufacturing a temperature indicator. In an embodiment the method comprises the steps of grinding an organic polymer; and dispersing the ground material in a bonding agent dissolved with solvent. Additives for improving specific properties can be added.

In an embodiment of the method for the manufacture of a temperature indicator, the indicator is applied onto the article with a method such as painting, spraying, atomizing, or printing.

In an embodiment, the present invention provides a method for manufacturing an envelope for elongated substrates, particularly for cables or cable splices with an article, comprising the steps of placing the heat-shrinkable article around the substrate, the longitudinal closure is then closed and is treated by application of heat until the substrate is surrounded in a sealing fashion and the color of the temperature indicator has fully changed.

Compared to previously used low-molecular, melting substances, the use of the fine-grained, organic polymers as a pigment with a suitable bonding agent yields many advantages. For example, the following advantages are provided.

As a coat, whether applied as an overall film or a droplets, the organic polymers yield an elastic film that does not damage the article during the shrinking and, in particular, in the cooling phase. Thus, for example, the formation of craters on the surface does not occur.

Additionally, the elastic properties of the organic polymers are advantageous particularly given the changes in shape the heat-shrinkable article undergoes, since they follow these undamaged.

Furthermore, environmentally harmful substances such as heavy metals are not contained in the present invention.

Still further, no thermal decomposition occurs, so that gaseous or tar-like decomposition products are not created.

Moreover, the use of a high-polymer, organic substances provides an improved temperature indicator.

Additionally, the solidified polymer melt is completely preserved as elastic film on, respectively, film region. No recrystallization occurs of a type that can not be entirely suppressed given low-molecular substances. The brittleness of the low-molecular substances occurring therein can potentially lead to the formation of new grain boundaries, so that an at least partial return into the initial condition ensures.

Further, no volatilization during the thermal treatment occurs. New back-formations (for example, white places) can potentially arise given low-molecular substances due to partial sublimation.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
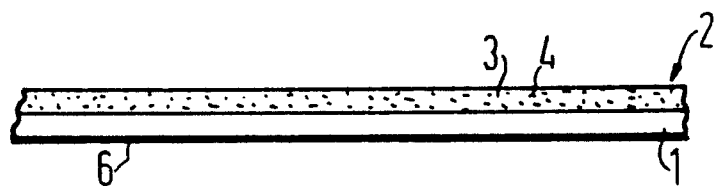
FIG. 1 illustrates a temperature indicator applied to an article as an overall film, prior to a thermal treatment.

The present invention provides an article having a color indicator that can be manufactured in a simple and economical fashion. The resultant article of the present invention does not produce reaction products upon application, and provides good compatibility with the surface of the article. Pursuant to the present invention, at least one organic polymer is used in the temperature indicator. The melting point of the temperature indicator lies at least in the region, preferably above the region, of the restoration temperature of the heat-shrinkable article.

The resultant article of the present invention provides many advantages over prior temperature indicators including the fact that harmful decomposition products are not present that can either pollute the environment or damage the surface of the coated article as a result of the use of an organic substance in the temperature indicator that melts without decomposing. The organic substance, fashioned as a polymer, also ensures that the article does not deattach from the surface even though the heat-shrinkable article changes its shape.

Pursuant to the present invention, only the organic substance and the bonding agent melts at the temperature indication point defined by the substance. The melt becomes transparent, or at least translucent. Even after cooling the indicator remains modified. Because the color indicator becomes transparent, the color on the surface of the article or, respectively, the color of the article itself, thereby becomes visible.

The irreversible "color change" that has occurred indicates that the desired temperature has been reached. This event can also be viewed as a warning that damage to the article can occur under certain circumstances above this temperature. An organic substance having a melting point having a different temperature threshold can also be selected. For example, it is important to recognize whether adequate heat for the activation of a heat-activatable sealant such as, for example, a hot-melt adhesive, that has been applied on the inside, was applied onto the outside of a heat-shrinkable article.

Pursuant to the present invention, an organic polymer ground into fine particles is used as the temperature indicator for a heat-shrinkable article. The mean grain size of the particles is preferably approximately 50 $\mu$m. Polymers usually present in the form of a granulate must be ground for use as a "pigment". Grinding can be performed in a suitable mill with cooling; airjet impact pulverizers are especially suitable for this purpose, wherein the grinding ensues, for example, while being cooled with liquid nitrogen.

Grinding should be performed at least to a filter grain size of approximately $\leq 200\mu$; preferably to a filter grain size of approximately $\leq 100$ $\mu$m, whereby the mean grain size amounts to approximately 50 $\mu$m.

A fine color application is advantageously achieved by using a polymer ground to a filter grain size of approximately $\leq 40$ $\mu$m; the mean grain size in this grinding amounts to approximately 10 to about 20 $\mu$m. Such a finely ground, organic polymer is applied onto the article as a suspension in a solution with a suitable bonding agent, being applied thereon together with a solvent. Depending on mixing, this coat will have a more or less white appearance. When the prescribed temperature threshold during the shrink process is achieved, the organic polymer and the bonding agent melt and a transparent, or at least translucent, melt of the fine-grained, organic polymer particles and the bonding agent is formed. This allows the article lying under the melt to appear providing a new appearance. For example, if the article, is composed of a shrink compound based on polyethylene permeated with lampblack, the black would then be visible through the transparent material.

Pursuant to the present invention no decomposition products are created. Further, since the material of the temperature indicator has been selected so that it is compatible with the material of the heat-shrinkable article, the surface of the heat-shrinkable article is not damaged or deleteriously change by the temperature indication.

Preferably high-polymer, organic substances that have a means molecular weight $M_n$ in the range from $10^3$ through $10^6$, preferably from $10^4$ through $10^5$, are used in the present invention. Although the organic polymer of the present invention is essentially colorless, it is a "pigment" in the sense of a visible color change as a temperature indicators, since it has a white appearance when finely ground.

The gound polymer and the corresponding bonding agent are advantageously provided with a solvent so that it can be in a paintable or sprayable form for application onto a shrinkable article. Accordingly, the application of the polymer onto an article is especially simple and cost-effective. For example, it can be painted on with a brush as a surface-covering film. This allows the article to be covered with a temperature indicator over its full surface.

Likewise, spray or atomizer tools such as, for exmaple, a spray gun, can be used that allow one to select the desired "degree of coverage". It is not fundamentally necessary that the temperature indicator covers the full-surface of the article. When atomizing or spraying, non-interconnected droplets that are more or less large, form on the surface of the article. These appear as color droplets, whereby the solvent evaporates during the following drying process. The surface color of the article is visible between the color droplets. When the prescribed temperature threshold is reached, the color droplets melt and small, transparent or translucent film regions, respectively, arise. The appearance of the article changes in that the surface exhibits the color of the article over the entire region. As in the case of the overall film, this is an irreversible process. Instead of spraying, some other, standard application process such as, for example, printing can be used for achieving specific temperature indicators.

By way of example and not limitation, examples of the present invention will be set forth in greater detail.

FIG. 1 illustrates a heat-shrinkable article 1 of the present invention. For example, a collar having a longitudinal closure for enevloping articles such as, for instance, a cable splice, that is coated with a temperature indicator 2. The temperature indicator is applied on the heat-shrinkable article 1 that has a defined color, preferably black. The indicator is applied thereon as a through, planar, overall film, whereby it is indicated that the finely ground, organic polymer particles 4 lie firmly bonded on the surface as a suspension in a solution of a suitable bonding agent 3.

On the basis of the marked, finely particulate granulation of the organic polymer 4, this illustration is intended to illustrate that the color indicator 2 is opaque in this condition. As in all the following figures, a coating composed of a heat-activatable sealant 6, for example a hot-melt adhesive is indicated on the second side of the heat-shrinkable article 1. The temperature indicator, for example, is arranged on the outside in order to monitor whether an adequate heat activation for the heat-activatable sealant 6 has occurrend.

Figure 2:
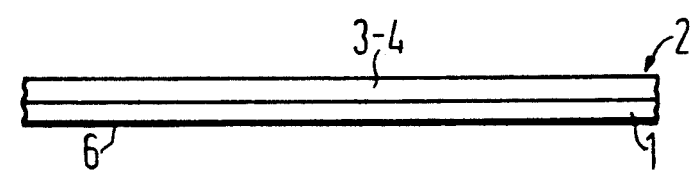
FIG. 2 illustrates the temperature indicator of FIG. 1 after the thermal treatment.

FIG. 2, by contrast, illustrates the finely particulate granulation of the organic polymer 4 after it has disappeared due to the thermal treatment. A uniform, transparent, or at least translucent, film 3-4 is formed. The color of the aricle 1 lying therebelow has now become visible through this film 3-4. The color change indicates that the thermal treatment can be stopped.

Figure 3:
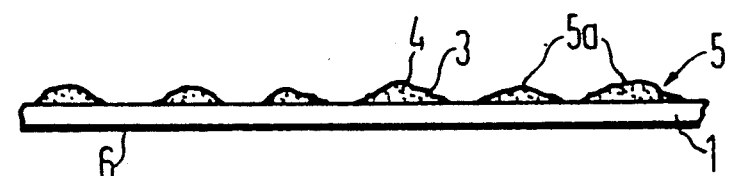
FIG. 3 illustrates a temperature indicator applied onto an article in drop form, prior to the thermal treatment.

FIG. 3 illustrates a further embodiment of a method for applying a temperature indicator 5 onto a heat-shrinkable article 1. The temperature indicator is applied in droplet form 5a for example by spraying or atomizing. As can be seen, the free, uncoated regions of the heat-shrinkable article 1 still lie between the individual droplets 5a, so that the collar of the heat-shrinkable article 1 appears here. As a "pigment", however, the droplets 5a have an appearance, with respect to their color before the thermal treatment, that corresponds to the organic polymer and its grain size. In this case, thus, an appearance corresponding to the color of the heat-shrinkable article 1 (for example, black) occurs in which spots of color (for example, white or gray) of different sizes corresponding to the droplets 5a are more or less uniformly distributed.

Figure 4:
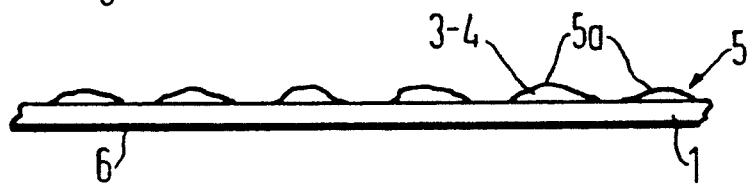
FIG. 4 illustrates the temperature indicator of FIG. 3 after the thermal treatment.

FIG. 4 illustrates the heat-shrinkable article 1 after a thermal treatment. The granulation of the organic polymer 4 in the bonding agent 3(and, thus, the white or, for example, gray color spots) has disappeared due to the melting, and uniform, transparent, or at least translucent, droplets 5a of a melt 3-4 of the organic polymer 4 and of the bonding agent 3 have formed. The color of the underlying and previously covered region of the article 1 that has now been heat-shrunken is also visible through these droplets 5a. Accordingly, an overall appearance is created that is continuous and corresponds to the color of the heat-shrunken article 1. A completely black appearance results given the use of typical heat shrink compounds.

Figure 5:
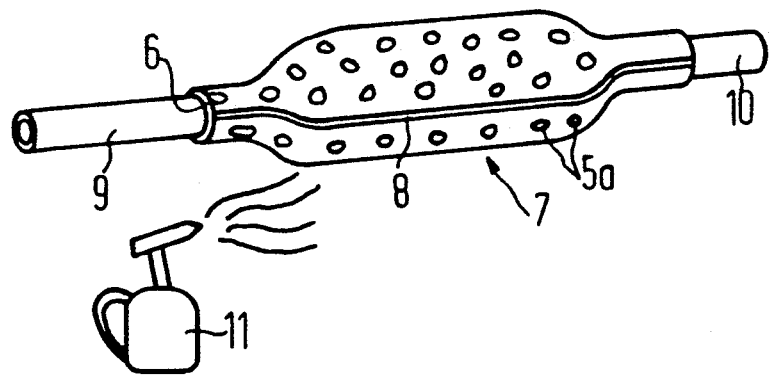
FIG. 5 illustrates a collar having a temperature indicator on a heat-shrunken article.

Referring now to FIG. 5, an envelope 7 in the form of a collar having a longitudinal closure 8 for a cable splice or, respectively, for a connection of cables 9, 10 that is already shrunked is illustrated. The regions indicated as spots 5a indicate that film regions of the temperature indicator are present here which—since the heat-shrunken condition is shown—have become transparent and allow the color of the collar to show through. The seal with respect to the cables 9, 10 proceeds on the basis of the inside coating of hot-melt adhesive 6. The application of heat can be achieved by use of a blow torch 11.

Thermoplastics, preferably semi-crystalline thermoplastics that change in state from a solid to molten at the desired temperature range can be used as organic polymers to be considered "pigments" for the temperature indicator used in the invention. In its normal condition, the polymer employed is preferably colorless and achieves its colored appearance due to the fine-grained distribution. Finely ground polyamides, particularly PA 6, PA 66, PA610, or PA12 or mixtures thereof are advantageously employed.

It can be also be desireable to use polyesters, preferably polybutylene terephthalate. Polycarbonates, polyolefines such poly-4-methylpentene-1, olefine copolymerizate and the like are also suitable for this purpose.

A polymeric resin, preferably an acrylate resin such as, for example, Paraloid B66, is advantageously used as a bonding agent. The bonding agent must be selected such that no chemical reaction occurs between it and the organic polymer. This allows the granulation of the polymer and the white or gray color, for example, that results therefrom to be preserved. Other bonding agents that can be used include: alkyd resins, acrylated alkyl resins; maleinate resins; theylene vinyl acetate copolymers; ethylene acrylic acid, ethylene acrylate copolymers; terpolymers of the monomers ethylene, vinyl acetate, acrylic acid, acrylic acid ester, maleic acid anhydride; ionomer; and polaymide resins.

These resins can be used alone or in blends with one another in order to achieve optimum adhesion properties. Preferably, the polymers have a mean molecular weight of from aproximately 3,000 to about 50,000.

Other materials that have adequatd adhesion vis-a-vis shrinkable articles, however, are also suitable as bonding agents, for example caoutchouc lattices.

Further adhesion promoters can be added having adhesive properties, for example Special Primer V 144 of Worlee.

1,1,1-trichloroethane can be utilized as a solvent. Other organic solvents matched to the bonding agent and the "pigment", however, can also be used. The "pigment", however, cannot be dissolvable by the solven, since the "color", for example white or gray, produced by the granularity would then no longer appear.

As needed, an additive of lampblack having a weight part of approximately $\leq 1\%$ can be added to this composition. The temperature indicator that appears gray due to the lampblack additive melts to form a black melt and a color change to black without black background thus ensues. The lampblack additive simultaneously contributes to the UV stabilization of the temperature indicator.

To improve the specific properties of the substances additional additives that can be used include: additional pigments, preferably azo pigments such as known Hansa yellow G; anti-oxidation agents, advantageously multi-nucleus, sterically hindered phenols such as, for example, Irganox 1010, Topanol CA, Nonox WSP; agents for preventing the formation of skins, advantageously ketoximes such as Metoxim, Butoxim of Acima AG, and thixotropic agents on an organic basis, advanageously derivatives of caster oil such as Thixatrol ST or Thixatrol GST of Kronos Titan GmbH.

By way of example and not limitation, an example of a temperature indicator of the present invention is as follows:

A temperature indicator that has a melting point of approximately 175° C. was produced with a composition composed of 25 g polyaminde 12 as pigment, 12.5 g Paraloid B66 as bonding agent and 20 g 1.1.1-trichlorethane as solvent. 0.025 g lampblack could also have been added to the composition.

The composition was applied with a spray gun onto a heat-shrindable collar as a white, gray with lampblack additive, coat. After evaporation of the solvent, the collar was shrunken onto a pipe having a diameter corresponding to the maximum range of use. It was shrunken thereon in a standard manner using an open flame. A noticeable "color change" from the original white or gray to black occurred. No damage to the collar surface occurred, no decomposition products arose, and no color restoration arose after cooling.

The temperature ranges for the areas of use given shrinkable articles such as envelopes and the like generally lie between 150° C. and 300° C. Accordingly, the melting point for the temperature indicators must likewise lie in this temperature range. Such change-over points can be disignationally defined on the basis of a suitable selection of the individual materials and of the grain size.

In a further embodiment, the polyamide 12 used was replaced by polyamide 6. Given otherwise identical conditions, the melting point of the composition and, thus, the "color change-over point" of the temperature indicator now lies at 215° C.

A further embodiment of a composition of the invention is based on the use of an organic polymer on the basis of polybutyleneterephthalate. The composition is composed of: 25 g polybutyleneterephthalate (Vestodur 1000 nf); 12 g polyvinylisobutylether (Lutonal l 30); 19 g ethylmethylketone/butylacetate (in a mixing ratio of 50:50), and 2.5 g special Primer V 944.

It should be understood that various changes and modifications to the presently preferred embodiments described herein will be apparent to those skilled in the art. Such changes and modifications can be made without departing from the spirit and scope of the present invention and without dimishing its attendant advantages. It is therefore intended that such changes and modifications be covered by the appended claims.

We claim:

1. An article having a temperature indicator applied thereon, the temperature indicator containing a bonding agent and at least one fine-grained organic substance that is largeley opaque below a defined temperature and that melts and irreversibly changes it optical properties when the defined temperature is reached, so that the temperature indicator becomes transparent or translucent comprising:

the temperature indicator including at least one organic polymer as the substance, said organic polymer being of high molecular weight with a mean molecular weight $M_n$ in the range from $10^3$ through $10^6$; and the temperature indicator is applied onto said article which is of a heat-shrinkable type, the melting point of the temperature indicator lies between 150° C. and 300° C. in the range of the restoration temperature of the heat-shrinkable article.

2. The article of claim 1 wherein the at least one fine-grained substance is produced by grinding.

3. The article of claim 1 wherein the substance has a filter grain size of $\leq 200$ μm, and the mean grain size lies between 10 and 50 μm.

4. The article of claim 1 wherein the substance has a filter grain size of $\leq 100$ μm and means grain size lies between 10 and 50 μm.

5. The article of claim 1 wherein the indicator operates at a temperature that lies in the range between 200° C. and 260° C.

6. The article of claim 1 wherein the substance is composed of a mixture of several polymers.

7. The article of claim 1 wherein the organic polymer is a polyamide.

8. The article of claim 1 wherein the organic polymer is chosen from the group consisting of: polyamide 66; polyamide 610; polyamide 12; polyester; polybutyleneterephthalate;polycarbonate;ployolefine;-poly-4-methylpentene-1; and an olefin copolymerizate.

9. The article of claim 1 wherein the polymer is at least semi-crystalline.

10. The article of claim 1 wherein a color change occurs that proceeds from white to black.

11. The article of claim 1 wherein a polymeric resin is used as the bonding agent.

12. The article of claim 11, wherein the bonding agent is selected from the group of polymers consisting of: an acrylate resin; alkyd resin; acrylated alkyd resin; maleinate resin; ethylene vinyl acetate copolymer; ethylene acrylene acid copolymer; ethylene acrylate copolymer; terpolymer of the monomers ethylene. vinyl acetate, acrylate acid, acrylate acid ester, and maleic acid anhydride; ionomer; and polyamide resin.

13. The artcile of claim 11 wherein the polymer bonding agent have a mean molecular weight from approximately 3000 to about 50,000.

14. The article of claim 12 wherein a mixture of the polymers is used as the bonding agent.

15. The article of claim 1 wherein the bonding agent is chosen so that it does not enter into any reaction with the organic polymer.

16. The article of claim 1 wherein the indicator includes an inorganic solvent.

17. The article of claim 1 wherein the indicator includes an organic solvent.

18. The article of claim 1 wherein the indicator has lampblack added to it in a weight part of approximately $=1\%$.

19. The article of claim 11 wherein the bonding agent is dissolved in a solvent.

20. The article of claim 1 wherein the grained organic polymer is dispersed in a solvent.

21. The article of claim 1 wherein an adhesion promoting agent, is added to the temperature indicator.

22. The article of claim 1 wherein means for preventing skinning. are added to the temperature indicator.

23. The article of claim 1 wherein a thixotroping agent is added to the temperature indicator.

24. The article of claim 1 wherein an anti-oxidation agent is added to the temperature indicator.

25. The article of claim 1 wherein additional organic polymers are added to the temperature indicator.

26. The article of claim 1 wherein the heat-shrinkable article is an envelope.

27. The article of claim 1 wherein the heat-shrinkable article is a cable sleeve.

28. The article of claim 26 wherein a heat-activatable sealant is arranged on the inside of the envelope.

29. The article of claim 1 wherein, the temperature indicator includes:
25 g polyamide 12
12.5 g Paraloid B66
20 g 1.1.1.-trichloroethane.

30. The article of claim 1 wherein the temperature indicator includes:
25 g polybutyleneterephthalate
12 g polyvinylisobutylether
19. g ethylemethyketone/butylacetate (50;50)
2.5 g Special-Primer V 944.

* * * * *